April 12, 1949.　　　　　　H. B. COLE　　　　　　2,466,685
GAUGE FOR USE WITH THE COOPERATING DIES
OF POWER BRAKES OR LIKE MACHINES
Filed Dec. 12, 1946　　　　　　　　　　　2 Sheets-Sheet 1
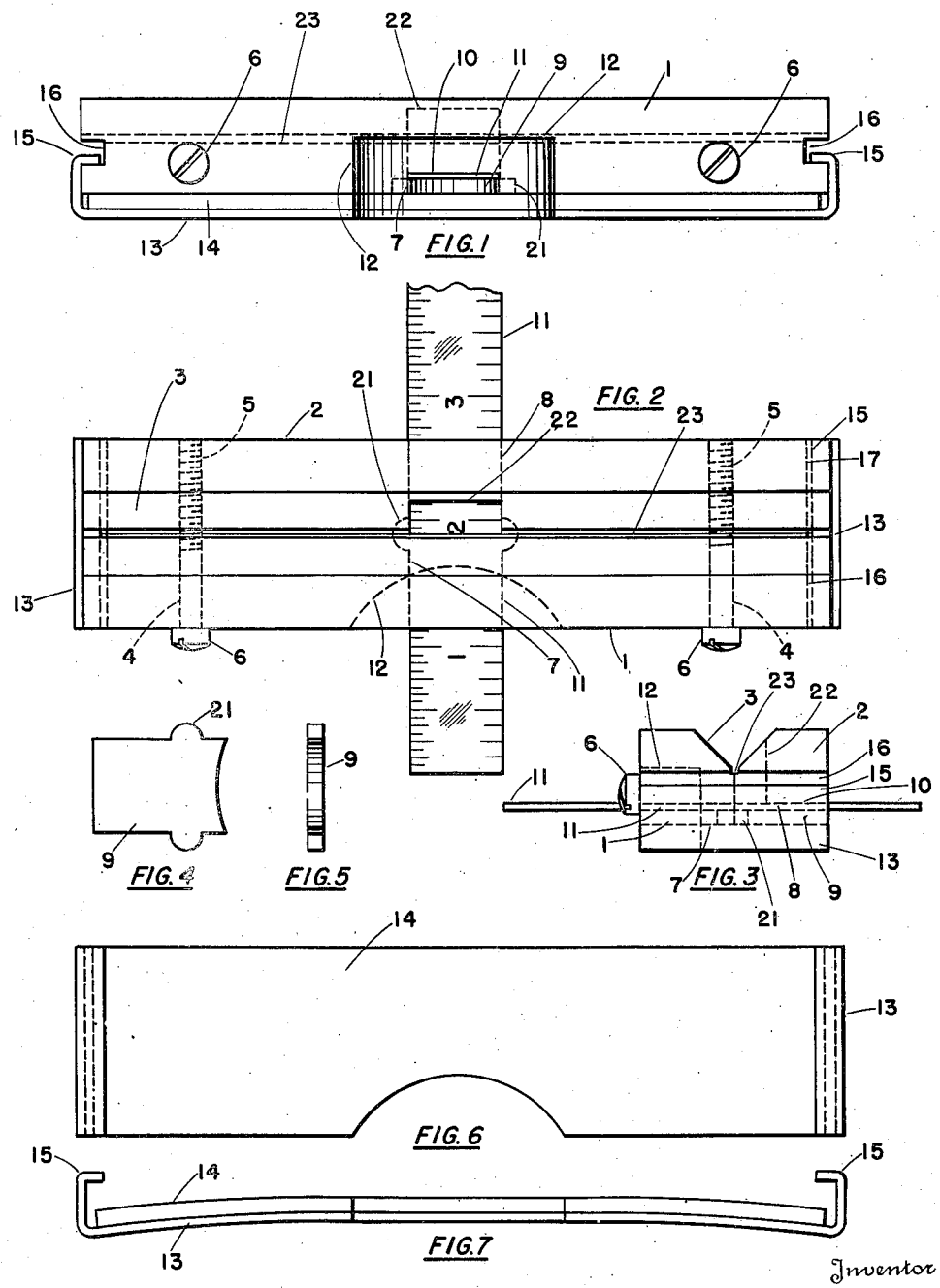
Inventor
HARRY B. COLE
By M. A. Hayes
Attorney April 12, 1949.  H. B. COLE  2,466,685
GAUGE FOR USE WITH THE COOPERATING DIES
OF POWER BRAKES OR LIKE MACHINES
Filed Dec. 12, 1946  2 Sheets-Sheet 2

Inventor
HARRY B. COLE

By  M. O. Hayes
Attorney

Patented Apr. 12, 1949

2,466,685

UNITED STATES PATENT OFFICE 2,466,685

GAUGE FOR USE WITH THE COOPERATING DIES OF POWER BRAKES OR LIKE MACHINES

Harry B. Cole, Vero Beach, Fla.

Application December 12, 1946, Serial No. 715,783

5 Claims. (Cl. 33—181)

(Granted under the act of March 3, 1883, as amended April 30, 1928; 370 O. G. 757)

This invention relates to a gauge construction and process and more particularly to a gauge for use in connection with power brakes or the like while being capable of other use.

An object of the invention is to provide a gauge construction embodying a scale member mounted for adjustment in the gauge and embodying means for frictionally retaining the scale member in adjusted position in the gauge.

A further object is to provide a gauge of simple and sturdy construction which embodies a V-shaped recess enabling it to be used in connection with the cooperating dies of power brakes or the like machines, one of the dies being received in the V-shaped recess in order to set the dies for desired bend by means of the gauge.

Another object is to provide a gauge so designed that the slidable scale thereof is locked in adjusted position by the dies of the machine cooperating with means on the gauge.

Other objects and advantages of the invention will be more apparent from the following description taken in connection with the accompanying drawings which are exemplary and in which:

Fig. 1 is an elevation of a gauge assembly embodying the invention;

Fig. 2 is a plan view of the same;

Fig. 3 is an end elevation;

Figs. 4 and 5 are detailed views of an insert member;

Figs. 6 and 7 are detailed views of the spring clamp and rubber cushion;

Figure 8:
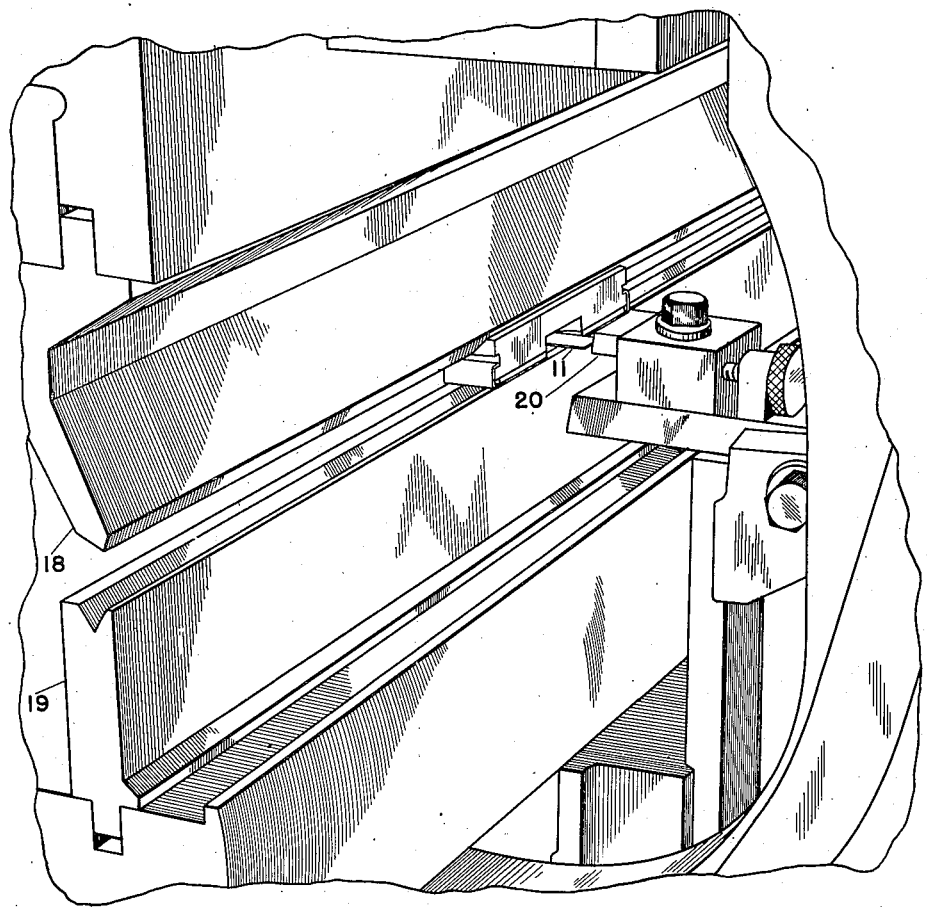
Fig. 8 is a view showing the use of the gauge.

Referring to the drawings, the gauge in the embodiment of the invention shown comprises a V-block or body construction comprising two elongated members 1 and 2 having their adjacent longitudinal faces so shaped as to provide a V-shaped recess 3 when placed in contact with each other, said recess terminating in a vertical walled groove 23 when the blocks are placed together.

The block or body members 1 and 2 are provided with aligning laterally disposed bores 4 and 5 receiving screws or the like 6 which secure the block members together.

The under sides of the block members 1 and 2 are provided with recesses 7 and 8 shaped as shown in the drawings. A portion of an insert member 9 shown in detail in Figs. 4 and 5 is received in the recess 7 of block member 1 and a portion of the insert member 9 is received in the recess 8 at the under side of block member 2. The insert member 9 is of such thickness in relation to the depth of the aligned recesses 7 and 8 that a space 10 is provided between the insert 9 and the block members to receive the scale member 11.

An enlarged recess 12 is formed at the under side of the block member in communication with the recess 7 thereof and provides for manual access to the scale member to adjust the same. A vertical slot or window 22 is cut through the beveled portion 3 of one of the blocks for reading the scale.

A spring clamp 13 and rubber cushion 14 shown in detail in Figs. 6 and 7 are applied to the block members 1 and 2. The spring clamp 13 has overturned ends 15 received in aligned notches or grooves 16 and 17 formed in the ends of the block members.

Desirably, the insert member 9 and the recesses 7 and 8 provide cooperating lateral extensions, as indicated at 21. This prevents movement of the insert longitudinally of the laterally extending recesses 7 and 8.

It will thus be apparent that a gauge is provided by the present invention in which the scale member 11 is mounted for ready adjustment relative to the body of the gauge while being frictionally retained therein in adjusted position by means of the spring clamp and insert member through which the pressure of the spring clamp is exerted upon the scale member.

Referring to Fig. 8, the device may desirably be used to set stop gauges on power or bending brakes, the scale being set for desired bend, placed between the dies 18 and 19 of the power brake, the male die then being lowered into the V-shaped recess of the block of the gauge, effecting a centering of the block and firmly locking the scale in its adjusted position by clamping it between the parts of the gauge held between the dies. The stop gauge 20 is then set against the fixed scale of the gauge.

While but one embodiment of the invention is shown and described it will be understood that various changes and modifications may be made therein without departing from the spirit and scope of the invention, which is not to be limited except by the terms of the appended claims.

The invention described herein may be manufactured and used by or for the Government of the United States of America for governmental purposes without the payment of any royalties thereon or therefor.

What is claimed is:

1. In combination in a gauge construction, a block construction comprising a pair of elongated block members having adjacent longitudinal faces with portions disposed in engagement, said faces being so shaped as to provide a longitudinal V- shaped recess therebetween for the reception of a die or the like to center the gauge, means removably securing the block members together, said block members having aligned recesses in their under sides and extending laterally thereof, a scale member slidably received in said aligned recesses, and underlying means for retaining said scale comprising a spring clamp member having over-turned ends, said block members having aligned slots in their ends receiving the over-turned ends of said spring clamp.

2. In combination in a gauge construction, a block construction comprising a pair of elongated block members having adjacent longitudinal faces with portions disposed in engagement, said faces being so shaped as to provide a longitudinal V-shaped recess therebetween for the reception of a die or the like to center the gauge, means removably securing the block members together, said block members having aligned recesses in their under sides and extending laterally thereof, a scale member slidably received in said aligned recesses, and underlying means for retaining said scale comprising a spring clamp member having over-turned ends, said block members having aligned slots in their ends receiving the over-turned ends of said spring clamp, said gauge construction including an insert member having a portion received in the recess at the under side of one of the block members and having another portion received in the recess in the under side of the other block member, said insert member being disposed between the slidable scale and the spring clamp.

3. In combination in a gauge construction, a block construction comprising a pair of elongated block members having adjacent longitudinal faces with portions disposed in engagement, said faces being so shaped as to provide a longitudinal V-shaped recess therebetween for the reception of a die or the like to center the gauge, means removably securing the block members together, said block members having aligned recesses in their under sides and extending laterally thereof, a scale member slidably received in said aligned recesses, and underlying means for retaining said scale comprising a spring clamp member having over-turned ends, said block members having aligned slots in their ends receiving the over-turned ends of said spring clamp, said gauge construction including an insert member having a portion received in the recess at the under side of one of the block members and having another portion received in the recess in the under side of the other block member, said insert member being disposed between the slidable scale and the spring clamp, said insert member and recesses having cooperating lateral extensions to prevent movement of said insert longitudinally of the aligned laterally extending recesses.

4. In combination in a gauge construction, a block construction comprising a pair of elongated block members having adjacent longitudinal faces with portions disposed in engagement, said faces being so shaped as to provide a longitudinal V-shaped recess therebetween for the reception of a die or the like to center the gauge, means removably securing the block members together, said block members having aligned recesses in their under sides and extending laterally thereof, a scale member slidably received in said aligned recesses, and underlying means for retaining said scale comprising a spring clamp member having over-turned ends, said block members having aligned slots in their ends receiving the over-turned ends of said spring clamp, said gauge construction including an insert member having a portion received in the recess at the under side of one of the block members and having another portion received in the recess in the under side of the other block member, said insert member being disposed between the slidable scale and the spring clamp, said insert member and recesses having cooperating lateral extensions to prevent movement of said insert longitudinally of the aligned laterally extending recesses, and an enlarged recess at the under side of one of said block members providing for manual access to the scale member, said spring clamp including a rubber cushion member carried thereby for engagement with the insert member and under sides of the block members.

5. In combination in a gauge construction, a pair of elongated block members having adjacent longitudinal faces with portions disposed in engagement, said faces being so shaped as to provide a longitudinal recess therebetween for the reception of a die or the like to center the gauge, means detachably securing the block members together, said block members having aligned recesses in their under sides and extending laterally thereof, a scale member slidably received in said aligned recesses, and means underlying and in engagement with said blocks and retaining said scale member in said aligned recesses.

HARRY B. COLE.

REFERENCES CITED

The following references are of record in the file of this patent:

UNITED STATES PATENTS

| Number | Name | Date |
|---|---|---|
| 407,617 | Seaver | July 23, 1889 |
| 624,876 | Sawyer | May 9, 1899 |
| 653,229 | Gamble | July 10, 1900 |
| 786,824 | Lynn | Apr. 11, 1905 |
| 2,212,802 | Walicki | Aug. 27, 1940 |